United States Patent [19]

Regensburger

[11] 4,209,049

[45] Jun. 24, 1980

[54] TRACTION DEVICES

[75] Inventor: Joseph Regensburger, Peabody, Mass.

[73] Assignee: Alpine Industries, Inc., Peabody, Mass.

[21] Appl. No.: 934,279

[22] Filed: Aug. 16, 1978

[51] Int. Cl.² ............................................. B60C 27/20
[52] U.S. Cl. ...................................... 152/216; 74/422; 152/218; 152/225 C; 152/228
[58] Field of Search ............... 152/225 R, 225 C, 228, 152/216, 218; 301/38 R, 40 R, 40 S, 41 R; 74/422

[56] References Cited

U.S. PATENT DOCUMENTS 3,891,018  6/1975  Hyggen ............................ 152/225 C
4,122,881  10/1978  Hyggen ........................ 152/225 R X Primary Examiner—John T. Goolkasian
Assistant Examiner—Thomas Bokan
Attorney, Agent, or Firm—Maurice R. Boiteau

[57] ABSTRACT

There is disclosed in the present application a traction device adapted to being mounted on a driving wheel tire of a vehicle for obtaining greater traction on ice or snow although the device may also be useful in certain types of mud. The device comprises four spring arms each including a textured traction portion positioned across the face of the tire tread. The device is quickly mounted over the tire by collapsing and spreading apart the tread portions to permit bringing the device into engagement with the tire from a radial direction. The four arms in two pairs are then disposed at right angles to each other and are thereafter simultaneously tightened into embracing generally equally spaced relationship with the tire by turning a spring loaded crank.

6 Claims, 4 Drawing Figures

TRACTION DEVICES

The present invention relates generally to devices adapted to being mounted on tires on the driving wheels of vehicles to improve traction in snow and on ice, and more particularly to such devices which may be readily and quickly mounted on the driving wheels when slippery snow and ice conditions are encountered and just as easily removed after the emergency has passed.

A wide variety of devices is available for mounting on automobile tires to provide added traction under slippery road conditions caused by snow and ice. Such devices include not only tire chains but a variety of other expedients more or less adapted to being mounted on the driving wheels of automobiles when needed and to be removed for travel on cleared pavement. These expedients, however, are not entirely suited for their intended purpose in that they are frequently difficult and time consuming to mount on the wheels of the vehicle, under the most difficult weather and environmental conditions. The motor vehicle operator who must rely on such conventional expedients is frequently forced to stand out in the cold getting wet while wrestling with a recalcitrant device. In addition, because of the prevalent desire of most motorists during a snow emergency to avoid snow covered highways, there is a tendency on the part of the motorist to seek out well travelled roads which are relatively free of snow. Consequently, the traction device must frequently be mounted and then removed or alternatively be sacrificed to premature wear. When the traction device is difficult to mount and remove, there is a tendency to leave it mounted when it should be removed and the result is excessive wear.

It is accordingly an object of the present invention to facilitate the mounting and removal of traction devices from vehicle wheels.

Another object is to provide a device which greatly improves traction on ice and snow, can be quickly mounted and dismounted and stored compactly when not in use.

Another object is to provide a device which, because of its construction and manner of use, is adapted to an extended period of reliable utility without damaging the vehicle on which it is mounted.

In the achievement of the foregoing objects, a feature of the invention resides in the provision of two pairs of opposed arms which are mounted in such a way that they may be collapsed into a generally flat package with one arm of each pair lying in close proximity to one of the other pair both to facilitate compact storage and also to permit approach to the wheel from a radial direction. This approach allows the mounting on the tire to take place from a position in which two arms are resting on the ground and the other two arms may easily be lifted to approximately their final positions with little effort. The advantageous mounting according to the present invention is greatly facillitated by another related feature which permits the arms to be extended simultaneously by turning a single crank.

The foregoing objects and features of the present invention, together with many advantages to be derived from it, will be more fully understood from the following detailed description of an illustrative embodiment taken in connection with the accompanying drawings in which.

Figure 4:
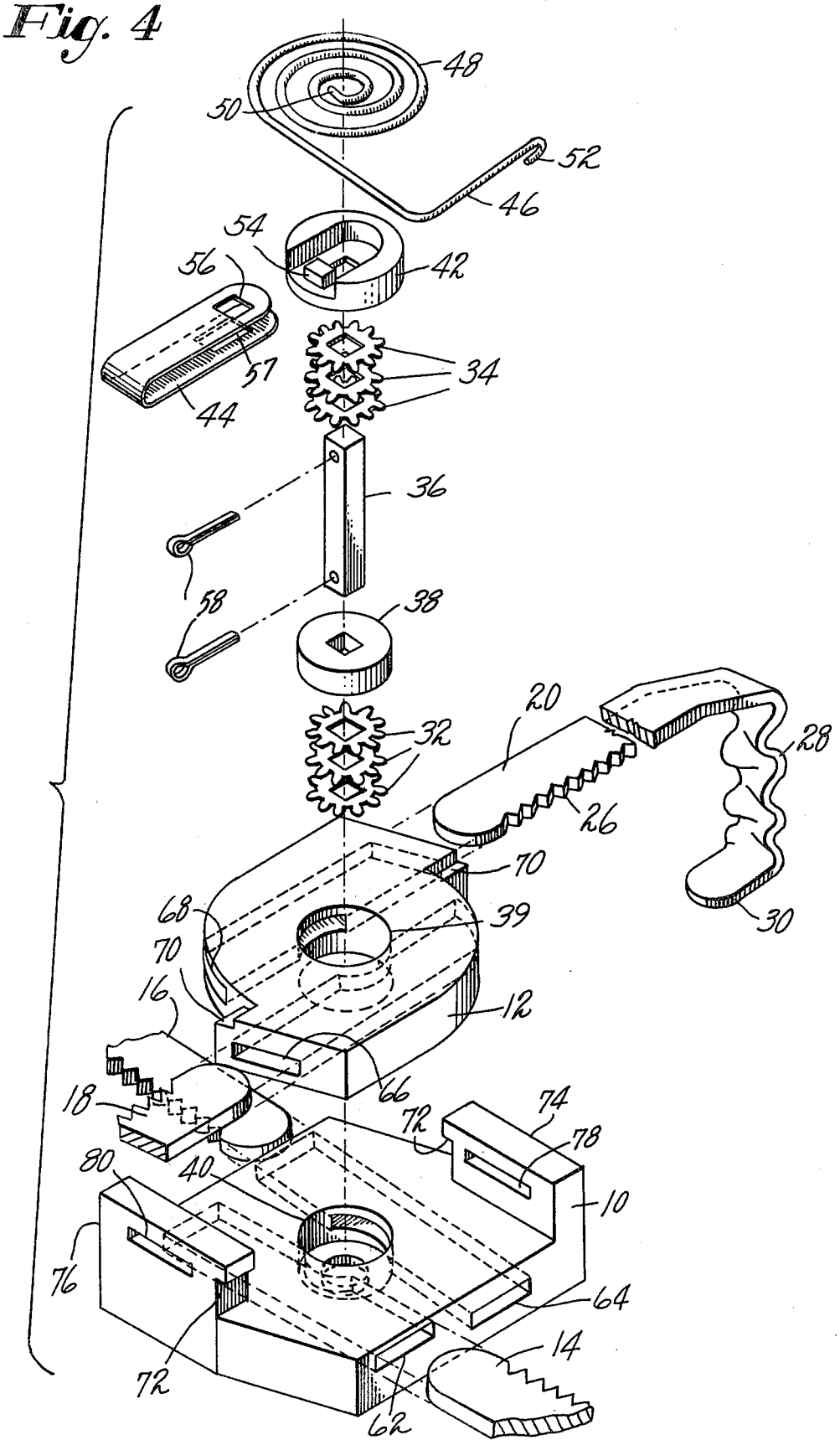
FIG. 4 is a view in perspective of the portion of the device depicted in FIG. 3, but with the parts shown in exploded relationship for clarity.

Turning now to the drawings, there is shown a traction device according to the present invention comprising a locking hub 10 and a carrier 12 mounted on the hub for pivotal motion. Slidable in the hub 10 are two opposed arms 14 and 16 while similar arms 18 and 20 are slidable in the carrier 12. Although each of the arms is to a certain extent individually shaped to accomodate to its function and mounting location, each includes the same elements and accordingly only the arm 20 will be described in detail as representative. The arm 20 includes a slide portion 24 in which is cut a series of rack teeth 26. Outwardly from the slide portion 24, the arm 20 is bent inwardly to connect the slide portion with a corrugated track portion 28 extending across the tire tread and terminating in a locking tail portion 30 extending behind the tire, as best seen in FIG. 4. The arms 14, 16, 18 and 20 are made of spring steel and are sufficiently flexible to conform to the tire as it is deformed under load. As a result the tread portion 28 and those of the other arms are always backed by the tire as they flex to accomodate to the deflection of the tire.

Figure 1:
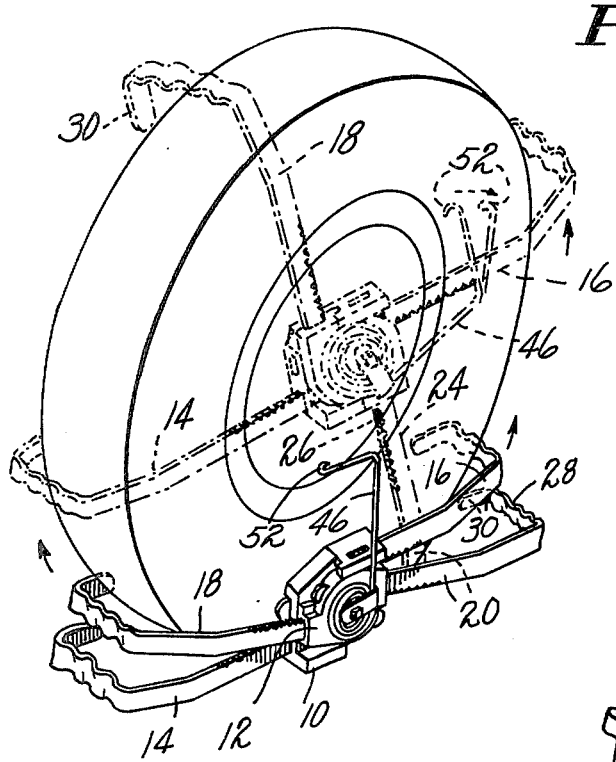
FIG. 1 is a view in perspective of a traction device according to the present invention being mounted on a wheel of a vehicle.
Figure 2:
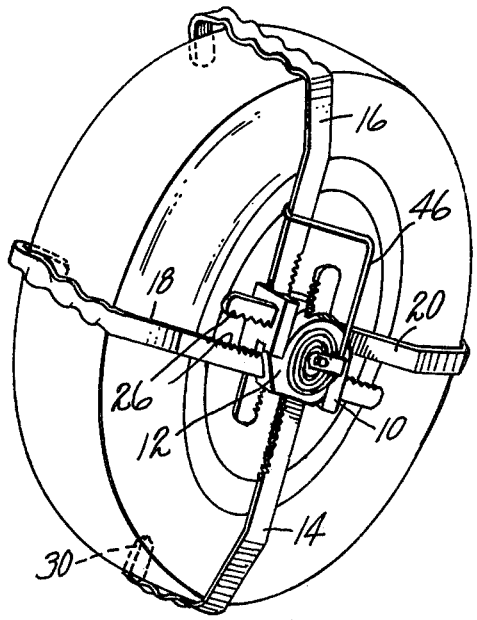
FIG. 2 is a view in perspective of the device of FIG. 1 but shown after it has been mounted on the wheel.
Figure 3:
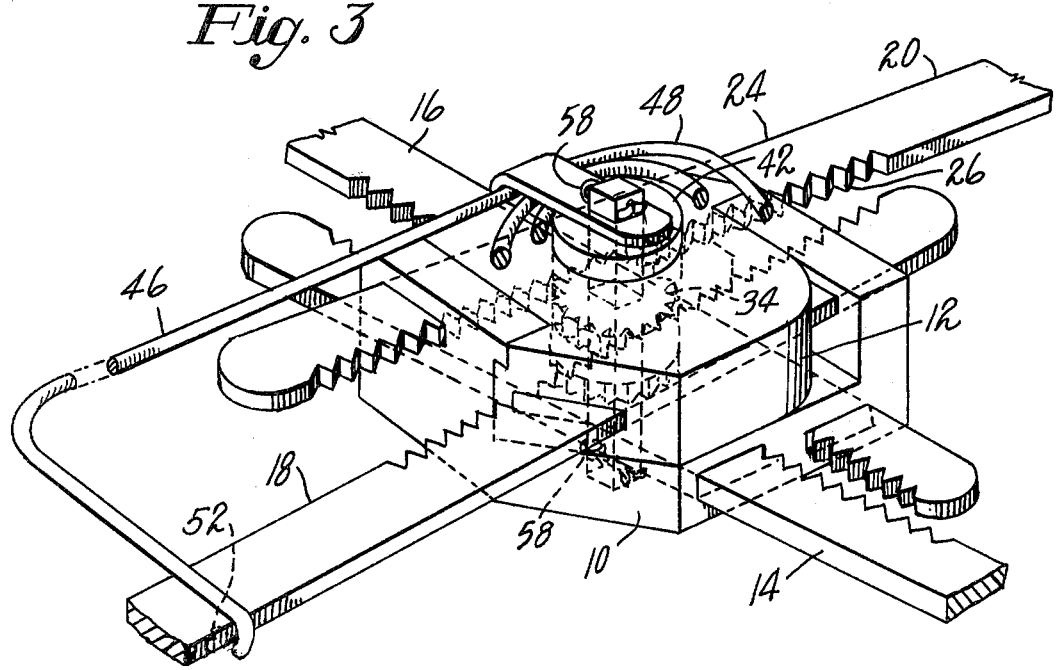
FIG. 3 is a fragmentary detail view also in perspective showing a central portion of the device of FIGS. 1 and 2.

It is seen from FIG. 1 that the present device is readily mounted on the vehicle by extending the arms 14, 16, 18 and 20 while the device is in the collapsed condition depicted in solid lines in FIG. 1. In order to mount the device on the tire, the arms 16 and 18 are then raised to a level above the center of the wheel, as shown in dashed lines in FIG. 1, and all four arms are then simultaneously retracted until they grip the tire tightly as shown in FIG. 2.

For extending and retracting the arms 14, 16, 18 and 20, the rack teeth on the arms 14 and 16 engage a pinion 32 while the teeth on the arms 18 and 20 engage a similar pinion 34, both pinions being mounted on a square shaft 36 below and above a cylindrical spacer 38 which fits on the shaft between the two pinions. For ease in manufacture, the pinions 32 and 34 are punched out of three relatively thin layers of sheet metal. Pivoting of the carrier 12 on the base 10 is provided by the spacer 38 which closely fits a bore 39 in the carrier 12 and a bore 40 in the hub 10. Above the pinion 34 on the shaft 36 as seen in FIG. 4, there is mounted a cap 42 which also fits the shaft and is formed with an indentation for receiving a U-shaped clip 44 and the inner end of a handle 46 in the form of a lever whose inward end portion is wound as a spiral spring 48 to fit between the arms of the clip and whose inner end is in the form of an offset tail 50 to be retained against turning relative to the shaft and whose distal end is shaped into a hook 52 to be secured to one of the arms as shown in FIG. 2, after the arms grip the tire firmly and the spring has been wound further. The tail 50 fits in the indentation in the cap 42 between an upstanding key 54 and the shaft 36. The clip 44 is formed with a square opening 56 in its upper leg and a larger rectangular opening 57 in its lower leg as seen in FIG. 4. The clip 44 thus embraces the spring section 48 and the opening 57 fits around the shaft 36 and the key 54 while the opening 56 fits over the shaft and under a cotter pin 58 passing through an appropriate opening in the shaft. A second cotter pin 58 fits into a perforation at the lower end of the shaft 36 below the hub 10 which is formed with a reduced diameter to the bore 40 to fit the shaft, thus retaining the whole assembly between the two cotter pins 58.

The hub 10 is formed with guideways 62 and 64, both of rectangular cross section, slidably fitting the arms 14 and 16 respectively and communicating with the bore 40 so that the rack teeth on the arms may be engaged by the pinion 32. Similarly, the carrier 12 is formed with guideways 66 and 68 in which the arms 18 and 20 are slidably fitted and the guideways in the hub communicate with the bore 39 so that the rack teeth on the arms may be engaged by the pinion 34. When the device is mounted on a wheel, as shown in FIG. 2, ledges 70 on the carrier 12 are slipped under overhanging abutments 72 which are part of integral upstanding ears 74 and 76 on the hub 10. The ears 74 and 76 are perforated at 78 and 80 to receive the rearward ends respectively of the arms 18 and 20 and thus lock together the whole assembly so that the carrier 12 is no longer free to pivot on the hub 10 and the arms 14, 16, 18 and 20 are retained in the relative positions depicted in FIG. 2, against relative angular displacement.

Having thus disclosed my invention, what I claim as new and desire to secure by Letters Patent of the United States is:

1. A traction device adapted to being mounted on a driving vehicle tire comprising a hub adapted to being positioned generally axially on the outside of the tire, a carrier pivoted on the hub, a first pair of opposed arms slidable in the hub, a second pair of opposed arms slidable in the carrier, each arm extending radially outwardly and being turned to cross the tire tread and extending radially inwardly on the inner side of the tire, means for extending and retracting the arms, and means for locking the carrier against pivotal movement on the hub when the device is in operative position on the tire and the pairs of arms are disposed generally normal to each other said carrier locking means includes perforated upstanding ears on the hub and a rearward extension on the carrier mounted arms entering the perforations when the device is mounted on the tire.

2. A traction device according to claim 1 further characterized in that the extending and retracting means comprises a shaft, a pair of pinions spaced apart on the shaft, rack teeth cut in the inner ends of the arms and engaging the pinions and a handle on the shaft for turning the pinions.

3. A traction device according to claim 2 further comprising a spiral spring formed in the handle near the shaft and a hook on the distal end of the handle adapted to engaging one of the arms when the device is mounted on the tire.

4. A traction device according to claim 1 further characterized in that, in each arm, the portion crossing the tire tread is corrugated for greater traction.

5. A traction device according to claim 1 further characterized in that each arm is formed of spring steel and shaped to permit the portion crossing the tire tread to be deflected with the tire.

6. A traction device according to claim 1 further characterized in that the carrier is pivotable on the hub to collapse the two pairs of arms into close proximity for storage and for ease of mounting on the tire.

* * * * *